(12) United States Patent
Fantappie et al.

(10) Patent No.: US 12,239,260 B2
(45) Date of Patent: Mar. 4, 2025

(54) SMART WATER BOTTLE

(71) Applicant: Pepsico, Inc., Purchase, NY (US)

(72) Inventors: Giancarlo Fantappie, Rancho Palos Verdes, CA (US); Steven T. Jersey, Laguna Niguel, CA (US)

(73) Assignee: PepsiCo, Inc., Purchase, NY (US)

( * ) Notice: Subject to any disclaimer, the term of this patent is extended or adjusted under 35 U.S.C. 154(b) by 335 days.

(21) Appl. No.: 17/526,411

(22) Filed: Nov. 15, 2021

(65) Prior Publication Data
US 2022/0151439 A1 May 19, 2022

Related U.S. Application Data

(60) Provisional application No. 63/114,634, filed on Nov. 17, 2020.

(51) Int. Cl.
*A47J 41/00* (2006.01)
*A47J 41/02* (2006.01)

(52) U.S. Cl.
CPC .......... *A47J 41/005* (2013.01); *A47J 41/0072* (2013.01); *A47J 41/0094* (2013.01); *A47J 41/022* (2013.01); *A47J 2202/00* (2013.01)

(58) Field of Classification Search
CPC .. A47J 41/005; A47J 41/0072; A47J 41/0094; A47J 41/022; A47J 2202/00
See application file for complete search history.

(56) References Cited

U.S. PATENT DOCUMENTS

| | | | |
|---|---|---|---|
| 10,889,482 B1* | 1/2021 | Maclean | B67D 1/0882 |
| 11,206,944 B2* | 12/2021 | Gonzalez | H02J 7/0045 |
| 2015/0136797 A1* | 5/2015 | Li | B65D 81/3841 |
| | | | 220/592.26 |
| 2016/0183730 A1* | 6/2016 | Bedi | A47J 36/2466 |
| | | | 219/442 |
| 2018/0333007 A1* | 11/2018 | Ganahl | A47J 31/005 |
| 2019/0223635 A1* | 7/2019 | Alexander | A47J 27/2105 |
| 2020/0093313 A1* | 3/2020 | Larsen | A47J 31/18 |

* cited by examiner

*Primary Examiner* — Kun Kai Ma
(74) *Attorney, Agent, or Firm* — Sterne, Kessler, Goldstein & Fox P.L.L.C.

(57) ABSTRACT

Resealable bottles for beverages. A bottle may include a main body with an opening for receiving contents and a reservoir for storing contents, a lid, and a bottom, which is interchangeable with an accessory for changing a characteristic of the contents. The lid may close the bottle and/or facilitate consumption of its contents. The bottle may support one or more indicators, such as LEDs, including a safety indicator that is configured to activate when the safety system is active and the resealable bottle enters an unsafe state. The accessory may provide, for example, heating and/or cooling.

18 Claims, 18 Drawing Sheets

SMART WATER BOTTLE

CROSS-REFERENCE TO RELATED APPLICATIONS

The present application claims benefit of and priority to U.S. Provisional Patent App. No. 63/114,634, filed Nov. 17, 2020, which is incorporated herein by reference in its entirety for all purposes.

BACKGROUND

Field of the Invention

The described embodiments generally relate to containers. In particular, embodiments relate to bottles for liquids.

Background

Some food and beverages are preferably served cold or hot. Chilled beverages, for example, may be preferred when the ambient temperature is high. Beverages such as coffee or tea may preferably be served hot. Some bottles may use ice as a means for chilling its contents. Some bottles may require ice to be placed directly in contact with the beverage to be cooled. Other bottles are made of stainless steel double walled to maintain the temperature of its contents. Bottles may store and transport food and beverages as well. Maintaining the integrity of the bottle and its contents, such as when a consumer is away from the bottle, is important.

BRIEF SUMMARY OF THE INVENTION

Some embodiments of the present invention include smart bottles for beverages. The bottle may be refillable and resealable. The bottle may provide storage and a means for consuming its contents. The bottle may provide heating or cooling to its contents using accessories, and may include a means for indicating to a user if the bottle has been controlled (e.g., moved or opened) and/or the contents have been exposed when not in the presence of the user.

For example, embodiments include bottles for beverages, where the bottle may include a main body that holds contents for storing and consuming purposes, a lid that is removably attached to the top portion of the main body, and an accessory that is removably attached to the base portion of the main body. The lid may include an indication related to data collected on the bottle or its contents. The lid may further include an opening for facilitating consumption of the contents disposed in the bottle. The accessory may provide a means for changing a characteristic of the contents disposed in the bottle. The base portion of the main body may be closed or open, and the top portion of the accessory may be closed or open.

Embodiments also include bottles with safety systems, where the safety system may be activated by a user via a user device of the user and monitors the safety of the bottle. The user device may connect to the bottle using wireless communication. The bottle may have identifying information such that user devices that identify the bottle are able to communicate with the same. The bottle may include an indicator that signals when the bottle enters an unsafe state. The unsafe state may include when the bottle is disconnected from the user device and in an open position. The bottle may be in an open position when it is at least partially open, such as when the bottle is in a fill position or a drink position. The fill position may include the bottle with the lid removed. The drink position may include the bottle with the lid removed or partially open.

Embodiments also include accessories for heating the contents of a bottle. A heating accessory may contain a rechargeable battery. The heating accessory may removably attach to the base portion of the main body. The main body may contain an inner sidewall and outer sidewall, and a flexible circuit disposed between the inner and outer sidewalls. The base portion of the main body may contain a locking element that engages with a locking element of the heating accessory. A user may receive feedback, such as a tactile or audible signal, when the locking elements engage such that the user is aware that the bottle is in a locked and accessorized position. When the bottle is in a locked and accessorized position with a heating accessory, the heating accessory may power the flexible circuit of the main body. Powering the flexible circuit may provide heating for the contents of the bottle.

Embodiments also include accessories for cooling the contents of a bottle. A cooling accessory may be composed by a container that includes a top chamber and a bottom chamber. The bottom chamber may store carbon dioxide, and the top chamber may support expansion of the carbon dioxide. The chambers may be separated by an insulated layer that may support a pressure regulating valve. The bottom chamber may contain a refilling valve configured to connect to a carbon dioxide gas pressurized tank for filling or refilling the bottom chamber. The top chamber may contain a safety opening that corresponds with a safety valve of the pressure regulating valve to provide an outlet for the expansion of carbon dioxide. Heat exchange between the main body of the bottle and the cooling accessory may cool the contents of the bottle. The sidewalls of both the top and bottom chambers and the base portion of the accessory may also be insulated to prevent heat losses and avoid freezing the hands of the user of the bottle. A user may shake the bottle to cycle its contents to the heat exchanging base portion of the main body. This may prevent freezing of some or all of the contents.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

DETAILED DESCRIPTION OF THE INVENTION

Figure 1:
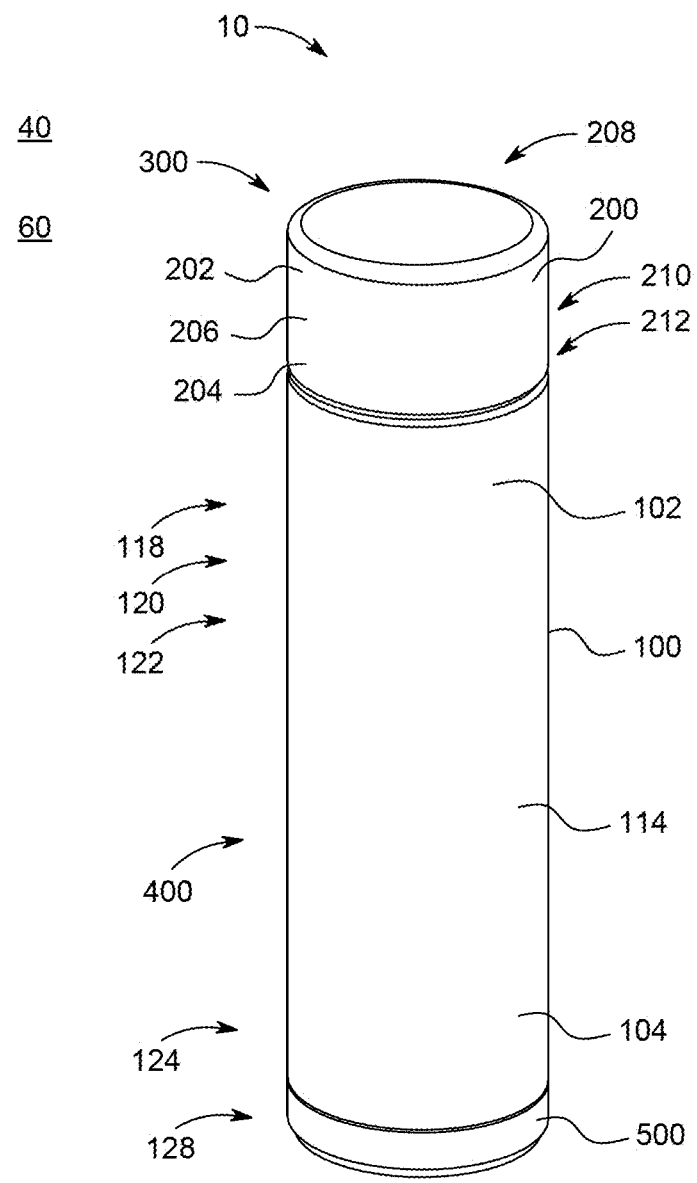
FIG. 1 is a perspective view of a bottle according to embodiments.

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with embodiments, it is submitted that it is within the knowledge of one skilled in the art to affect such feature, structure, or characteristic in connection with other embodiments whether or not explicitly described.

Existing bottles may not have smart capabilities. They may include, for example, traditional parts of a bottle such as a reservoir and a lid. However, these bottles may not provide additional capabilities that elevate a user's experience. For example, a bottle may not display information related to the bottle or its contents. Further, a bottle may not support elective components that provide such information. Similarly, a bottle may not have capabilities for changing a characteristic of its contents or support elective components that provide such functions.

Existing bottles also may not have smart capabilities related to safety. Safety may refer to the integrity of the bottle and its contents such that a user's health and/or well-being are not negatively affected. These bottles may not be able to provide a safety indication related to the bottle and its contents. Existing bottles may allow a user to store and transport a food or beverage for later consumption. However, a user may not have the bottle in their possession at all times. For example, a user may place the bottle on a table and walk away, returning after a period of time. While not in the line of sight of the user, the bottle and its contents may be vulnerable in that the bottle may be controllable by someone other than the user and/or the contents may be exposed. Further, without any indication notifying the user of an adverse event, the user will not have knowledge of possible tampering (e.g., control of the bottle by someone other than the user and/or exposure of the bottle's contents). The user may be required to keep the bottle with them to prevent risk related to the safety of their bottle and its contents. Lacking the ability to place a bottle down for later retrieval may negatively affect the user's experience.

Additionally, although existing bottles may provide thermal insulation, a user's control over the temperature of its contents may be limited. For example, while the contents are stored in the bottle and prior to consumption, the contents may react to ambient conditions. A hot beverage may cool when the ambient temperature is cooler and a cold beverage may warm when the ambient temperature is warmer. Further, these bottles may limit a user's control over the rate of temperature change. Thermal insulation may only delay the natural cooling or warming of the contents to gradually bring the contents' initial temperature to the value of the ambient temperature. Consuming a beverage or food at an undesirable temperature may negatively affect the user's experience.

Existing cooling methods in bottles may utilize ice as the primary mechanism for chilling beverages that are to be consumed. These cooling methods may include, for example, a thermally insulated bottle filled with ice into which a beverage may be poured. However, ice for this cooling method may be difficult to procure and replenish, particularly when the bottle and ice maker are in different locations. Attempts to accompany the bottle with additional ice for replenishing may result in the ice melting before being needed. Similarly, ice may be used for cooling before cooling is necessary, such as when a user prepares their bottle for storage and transport. A beverage may already be cold at this point. This wastes resources that could otherwise be used when needed, such as when a beverage has warmed. Further, using ice as the primary cooling method may limit a user's control over the temperature of the beverage as well as the rate at which the beverage is cooled.

Existing bottles that use ice to cool contents may require the ice to be placed directly in contact with the contents. Although this may chill a beverage contained in the bottle, the concentration of the beverage will vary as the ice melts, thereby diluting the drink. This dilution may be less than desirable in drinks that have specific ratios of ingredients, such as sports drinks. Further, these bottles cannot provide desired cooling for food contents. Placing ice directly in contact with food may be less than desirable in foods that require specific tastes and textures for user satisfaction, which may be negatively affected by the addition of ice. Even further, if the bottle is not double walled and/or the thermal insulation is insufficient, as the ice melts when it comes in contact with the relatively warm surface of the bottle, the surface of the bottle will become wet. This may require a user to wipe off the bottle before drinking the beverage, which may negatively affect the user's experience.

Existing bottles may not support the attachment of some or all accessories at the base of the bottle. Bottles may include, for example, only traditional components such as a reservoir and a lid. Although the bottle may provide core functions such as storage and transportation of a food or beverage for later consumption, the bottle may not provide additional capabilities that elevate a user's experience. For example, the base of the bottle may be sealed so that the only opening is at the top of the bottle. Sealing the base may prevent attachment of accessories that extend into the reservoir to change a characteristic of the contents disposed in the bottle. Further, the base of the bottle may completely lack an attachment means for supporting accessories. This may prevent attachment of all accessories, including accessories that do not extend into the reservoir.

Existing bottles that support changing a characteristic of its contents may utilize the lid as the mechanism to do so. While the lid may provide this function, it may be less effective in changing a characteristic of the contents than an accessory. Specifically, the bottle's capabilities may be limited since the lid is the mechanism that places the bottle in an open position. For example, a lid with a cooling function requiring ice may cause the ice to melt faster when the lid is opened. Further, a lid with a heating function may only provide heating when attached to the reservoir. However, some bottles may require removal of the lid to consume the contents of a bottle. A user cannot then use a bottle for heating at all times that is only in an open position when the lid is completely removed.

As described herein, embodiments may provide efficient systems and methods for providing smart capabilities in resealable bottles. Some bottles may include a safety system that may be activated by a user. A bottle may include an indication related to data from the bottle and its contents. For example, the indication may signal when the bottle and its contents have entered an unsafe state. The bottle may include a main body and a lid that is removably attached to the top portion of the main body. Some bottles may support accessories that may change a characteristic of the contents of the bottle. An accessory may be removably attached to the base portion of the main body. When the accessory is attached, a locking element on the accessory may engage with a locking element on the main body. This engagement may produce feedback such as a tactile or audible signal. Once an accessory is locked into the bottle, the accessory may function to change a characteristic of the contents of the bottle. Ensuring that the bottle is in the locked and accessorized position may prevent resource and/or energy loss. A predetermined force may be needed to unlock the components and remove the attachment.

The bottle may include a heating element for heating the contents of a bottle. A heating capability may be incorporated into an accessory. A heating accessory may include a battery that powers a flexible electrical circuit with appropriate resistance elements, which may be disposed between inner and outer sidewalls of the main body. The bottle may include a cooling element for cooling the contents of a bottle which also may be incorporated into an accessory. A cooling accessory may include a top chamber and a bottom chamber, where the bottom chamber stores carbon dioxide gas under pressure and the top chamber supports expansion of the carbon dioxide gas. The two chambers may be separated by an insulated layer that may support a pressure regulating valve. The bottom chamber may contain a refilling valve configured to connect a carbon dioxide tank for refilling (e.g., via an adapter). The top chamber may contain a safety opening configured to provide an outlet for the expansion of carbon dioxide. Heat exchange between the main body and the cooling accessory may provide cooling for the contents of the bottle. The sidewalls of the bottom chambers and the base portion of the accessory may also be insulated to prevent losses. A user may shake the bottle to cycle its contents to the heat exchanging base portion of the main body. This may prevent freezing of its contents in proximity of the heat exchanging bottom of the bottle and allows a more uniform distribution of the temperature of the contents inside the bottle.

Figure 2:
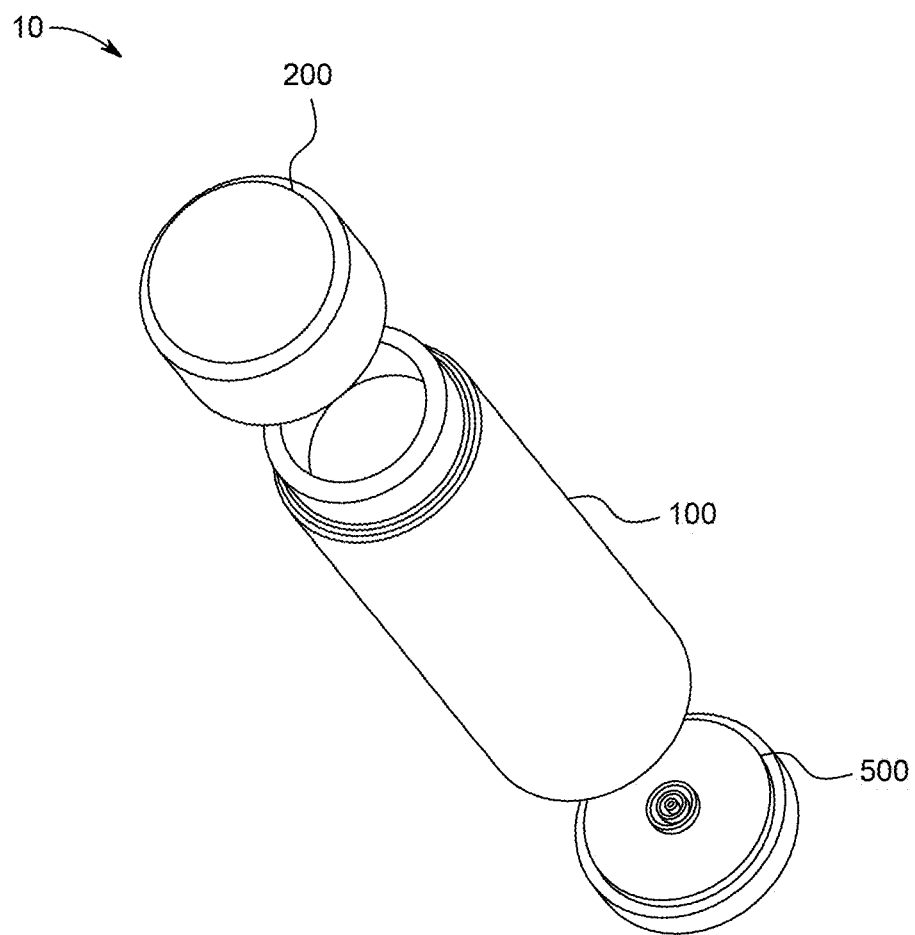
FIG. 2 is an exploded view of a bottle according to embodiments.

Embodiments will now be described in more detail with reference to the figures. With reference to FIGS. 1-2, a bottle 10 includes smart capabilities and a resealing capability. Bottle 10 may include a main body 100, a lid 200, and a bottom/accessory 500. Throughout the disclosure, components may be referred to with reference to bottle 10 but it will be appreciated that other containers may be used (e.g., thermoses, jugs, cans, squeeze bottles, reservoir packs, etc.).

Figure 3:
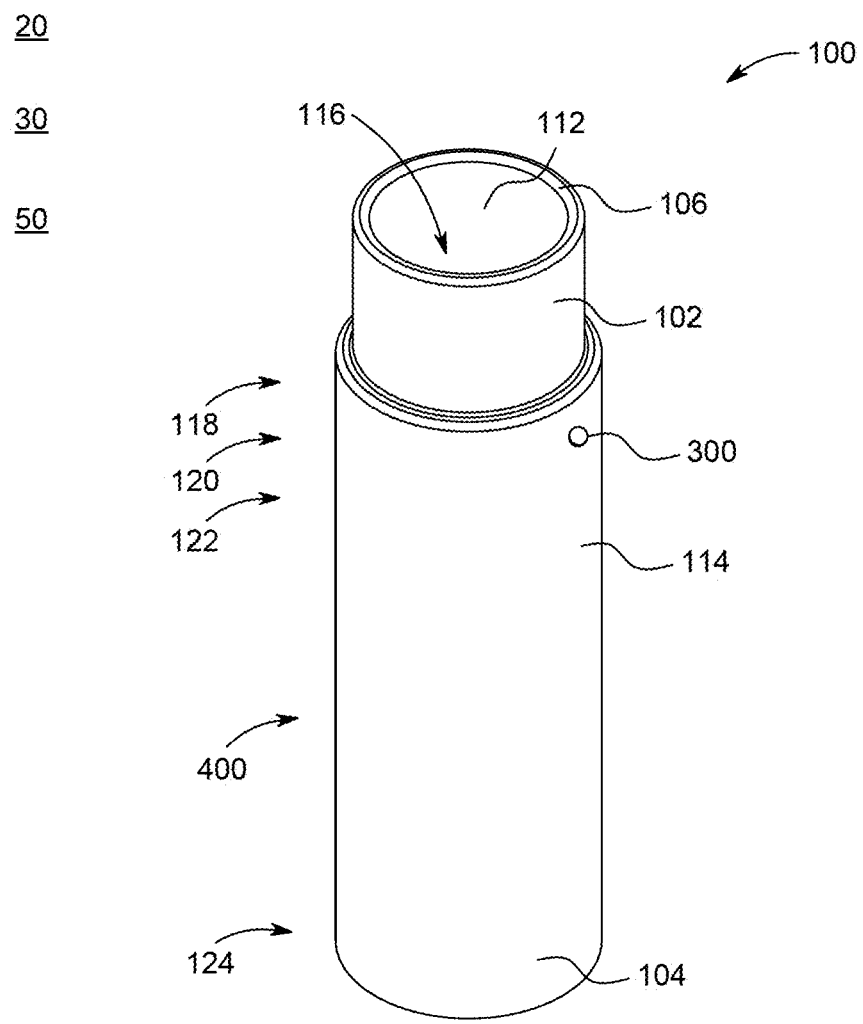
FIG. 3 is a perspective view of a main body of a bottle according to embodiments.
Figure 4:
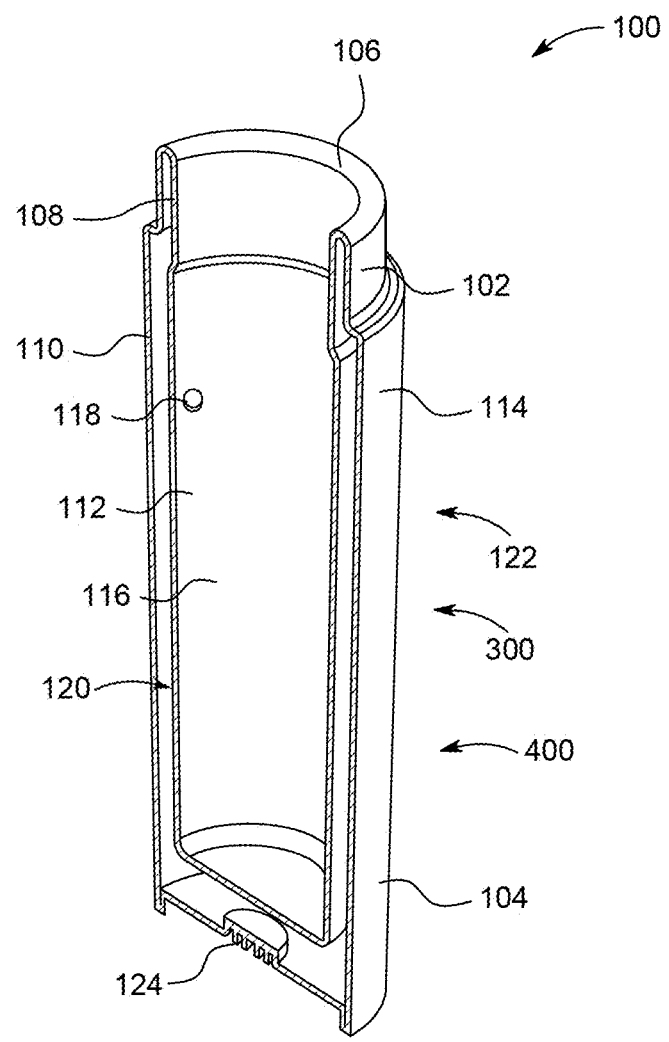
FIG. 4 is a perspective cross-section view of a main body of a bottle according to embodiments.

With reference to FIGS. 2-4, in some embodiments, main body 100 comprises stainless steel. Main body 100 may comprise other materials, such as, for example, aluminum, other metals, plastic, composite materials and combinations thereof, including, for example, steel, fiberglass, bamboo, etc. Main body 100 may include an exterior surface 114 defining the shape of bottle 10 and an interior surface 112 defining an interior space, or reservoir 116. Interior surface 112 and exterior surface 114 may be made of the same or different materials. In some embodiments, main body 100 comprises a generally tubular or cylindrical shape. In some embodiments, main body 100 may comprise other shapes, including, for example, cubical, rectangular, spherical, or conical, and may or may not be symmetrical about any axis.

In some embodiments, main body 100 may include a top portion 102. Top portion 102 may be considered, for example, to be a mouth or neck of main body 100. Top portion 102 may or may not comprise the same shape as other parts of main body 100. Further, in some embodiments, top portion 102 may comprise shapes, including, for example, cubical, rectangular, spherical, or conical, and may or may not be symmetrical about any axis. In some embodiments, top portion 102 may be considered, for example, to be wide or narrow. In some embodiment, top portion 102 may contain an opening for receiving contents into reservoir 116.

Reservoir 116 may be configured to receive and store liquid and/or solid contents. Main body 100 may further contain sidewall 106 that forms the side of bottle 10. As shown in FIG. 4, for example, sidewall 106 may contain an inner sidewall 108 and an outer sidewall 110. In some embodiments, main body 100, or a portion of main body 100, may include a thermally insulating material to reduce the exchange of heat between reservoir 116 and the ambient conditions surrounding bottle 10. In some embodiments, a layer of air may be sealed between the inner sidewall 108 and the outer sidewall 110 to act as a thermal insulator. In some other embodiments the layer of air could be at low pressure and some vacuum might artificially be created to enhance adiabatic proprieties of the bottle and thermally insulate its contents from the external ambient. In some embodiments, the space between inner sidewall 108 and outer sidewall 110 may be constant throughout main body 100 including if, for example, main body 100 is asymmetrical about an axis.

As shown in FIGS. 1-2, in some embodiments, main body 100 may include a base portion 104. In some embodiments, a bottom/accessory 500 may be configured to removably attach to base portion 104. Base portion 104 may be configured to receive bottom/accessory 500 such that base portion 104 completely covers at least a top portion of bottom/accessory 500 (e.g., base portion 104 may be threaded and/or of a larger diameter than a top portion of bottom/accessory 500). At least a top portion of bottom/accessory 500 may be correspondingly configured (e.g., contain threading and/or a smaller diameter than base portion 104). For example, bottom/accessory 500 may screw into base portion 104. In some embodiments, the attachment may be a bayonet threaded turn, e.g., a ⅛-¼ turn. In some embodiments, base portion 104 may receive bottom/accessory 500 after a predetermined force is applied to it. In some embodiments, bottom/accessory 500 may be optionally added to bottle 10 to change a characteristic of the contents disposed in bottle 10.

In some embodiments, base portion 104 may include a locking element 128. Locking element 128 may correspond to a locking element of bottom/accessory 500. For example, locking element 128 may be a retractable button (e.g., a spring button) that engages with locking element of bottom/accessory 500 which may be a slot. In some embodiments, the engagement may be a snap fit connection. In other embodiments, the engagement may be a press fit connection. In other embodiments, the engagement may be a magnetic connection, in other embodiments, a simple thread or a twist-and-lock connection. Engagement of the locking elements may provide feedback (e.g., a tactile or audible signal) that indicates to a user that bottom/accessory 500 is locked into main body 100. When bottom/accessory 500 is locked into main body 100, bottle 10 moves from the unlocked/unaccessorized position 50 to a locked/accessorized position 60. In some embodiments, a predetermined force may be applied to remove bottom/accessory 500 from main body 100 such that bottle 10 moves from locked/accessorized position 60 to the unlocked/unaccessorized position 50.

In some embodiments, bottom/accessory 500 is simply a bottom portion of bottle 10 that may keep reservoir 116 separate from the ambient environment. In this way, the temperature of contents disposed in reservoir 116 may be maintained for a length of time. This bottom/accessory 500 does not change a characteristic of the contents disposed in reservoir 116. In other embodiments, when it is desired to change a characteristic of the contents disposed in reservoir 116, a bottom/accessory 500 that is an accessory may be interchanged.

In some embodiments, base portion 104 of main body 100 may be sealed or open. In some embodiments, bottle 10 may support a bottom/accessory 500 that has a top portion that is sealed or open. Bottom/accessory 500 does not extend into reservoir 116. Example accessories will be described in further detail below, however it will be appreciated that other accessories may be used. Bottom/accessory 500 may relate to a plurality of functions, such as, for example, filtering, infusing, cleaning, heating, or cooling, and combinations thereof. Bottom/accessory 500 may be compatible with certain main bodies 100 of bottle 10. In an example, base portion 104 of main body 100 may be transparent to allow UV rays to penetrate in a UV sanitization bottom/accessory 500 (i.e., the UV light is in optical communication with the reservoir 116 of main body 100). In some embodiments, bottom/accessory 500 comprises metal, plastic, or a composite material, and combinations thereof, including, for example, steel, fiberglass, bamboo, etc. In some embodiments, bottom/accessory 500 may include one or more chambers (e.g., a main chamber, a second chamber, etc. that may perform the functions of, for example, heating accessory 600 in FIGS. 9-10 and/or cooling accessory 700 in FIGS. 12-13) for changing a characteristic of the contents disposed in bottle 10.

In some embodiments, bottle 10 may support a plurality of lids. Bottle 10 may, for example, support multiple varieties of lids such that a user may use different lids according to the contents to be consumed. For example, a different lid may be desirable for consuming a cold beverage versus a hot beverage.

Figure 5:
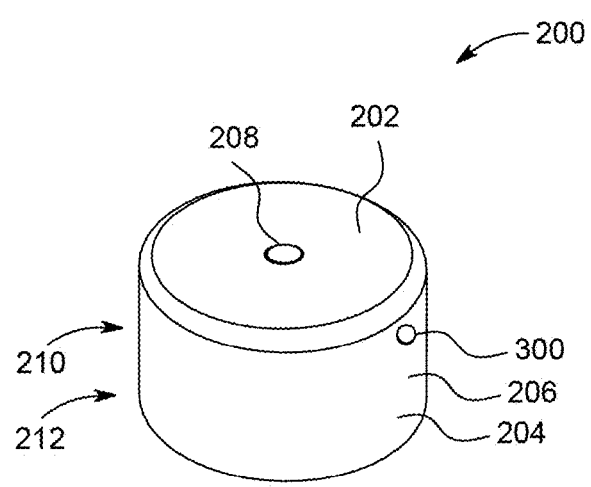
FIG. 5 is a perspective view of a lid for a bottle according to some embodiments.

As shown in FIGS. 1-2 and 5, in some embodiments, a lid 200 may be configured to removably attach to top portion 102. In some embodiments, lid 200 comprises metal, plastic, composite material, and combinations thereof, including, for example, steel, fiberglass, bamboo, etc. Lid 200 may contain, for example, a top portion 102 and a base portion 204. In some embodiments, top portion 102 of bottle body 100 may be configured to receive base portion 204 of lid 200 such that base portion 204 completely covers top portion 202 (e.g., base portion 204 may be threaded and/or of a larger diameter than top portion 102). Top portion 102 may be correspondingly configured (e.g., top portion 102 may be threaded and/or of a smaller diameter than base portion 204). For example, lid 200 may be a screw cap that screws onto top portion 102 via base portion 204.

In some embodiments, lid 200 may enclose top portion 102 via base portion 204 after a predetermined force is applied to it. Lid 200 may be connected to top portion 102 in a closed position (e.g., closed/storage position 40). However, in some embodiments, lid 200 may remain connected to top portion 102 in an open position (e.g., open/fill position 20 or open/drink position 30) as well. For example, lid 200 may be a swing top that removably encloses top portion 102 while remaining connected to top portion 102 (e.g., lid 200 may be hinged or latched to main body 100).

In some embodiments, bottle 10 may be in an open position when disposing contents into reservoir 116. For example, open/fill position 20 may include lid 200 clearing the opening of top portion 102 such that bottle 10 may be filled (e.g., lid 200 is removed from main body 100 or lid 200 is swung open, such as in a swing top embodiment). Bottle 10 may be in an open position when consuming contents disposed in reservoir 116. For example, open/drink position 30 may include a portion of lid 200 being opened to facilitate drinking.

In some embodiments, bottle 10 may be in an open/drink position 30 while lid 200 remains connected to top portion 102. For example, top portion 202 of lid 200 may contain opening 208 that facilitates drinking. Opening 208 may contain a covering that is, for example, biased to fully cover opening 208 such that when covered, bottle 10 is in a closed position (e.g., bottle 10 is in closed/storage position 40). In some embodiments, the covering may be a tab that slides to expose opening 208. In some embodiments, the covering may be hingedly connected to lid 200 such that opening 208 is exposed when the covering is swung open. The tab may be capable of engaging with lid 200 to maintain opening 208 such that the biasing force is overcome. In some embodiments, the covering may be flexible (e.g., a flap) that facilitates the addition of a drinking mechanism (e.g., a straw or straw-like element). A drinking mechanism may be inserted through opening 208 such that when inserted, bottle 10 is in an open/drink position 30. In some embodiments, removal of the drinking mechanism may return bottle 10 to a closed position (e.g., closed/storage position 40). In some embodiments, there may be a spout lid that may disengage manually. In some embodiments, bottle 10 moving to an open position (e.g., open/fill position 20 or open/drink position 30) may provide relief of pressure within bottle 10 (e.g., residual pressures as a result of the contents being carbonated or hot). In some embodiments, lid 200 may include a relief button or ramped seal (not shown) that may be activated prior to bottle 10 moving to an open position, or while bottle 10 is moving to an open position. In some embodiments, lid 200 may include threads that relieve pressure, similar to PET (polyethylene terephthalate) bottles and caps that are commonly known.

Figure 9:
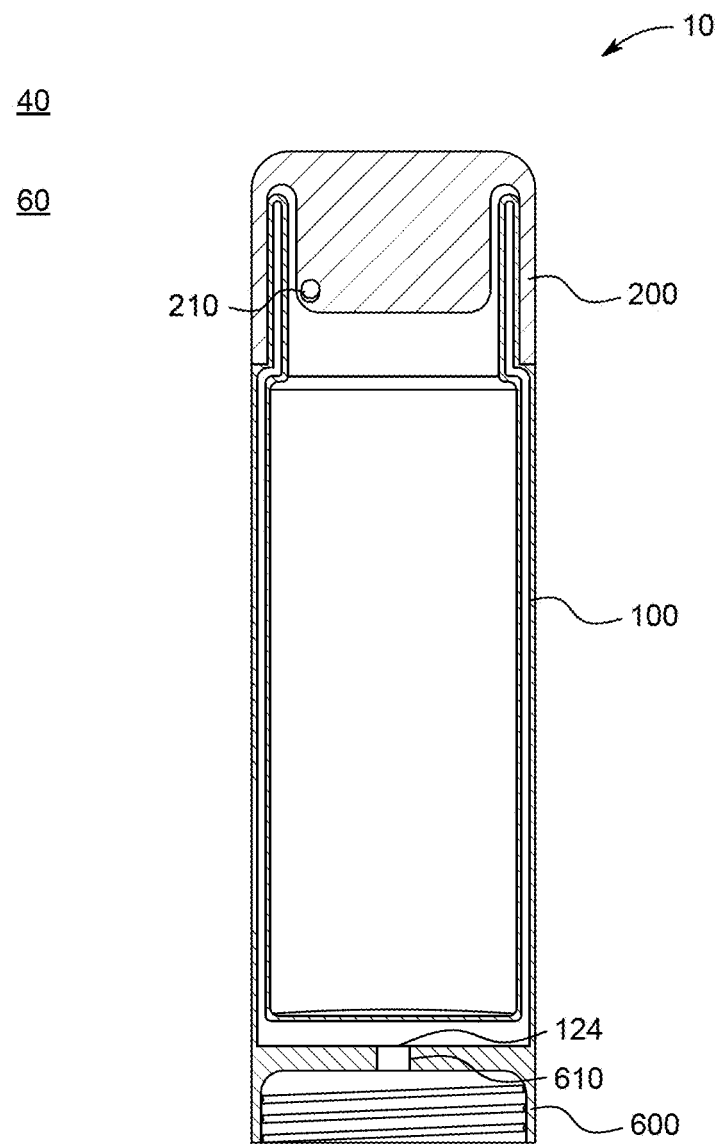
FIG. 9 is a side cross-section view of a bottle according to embodiments.
Figure 13:
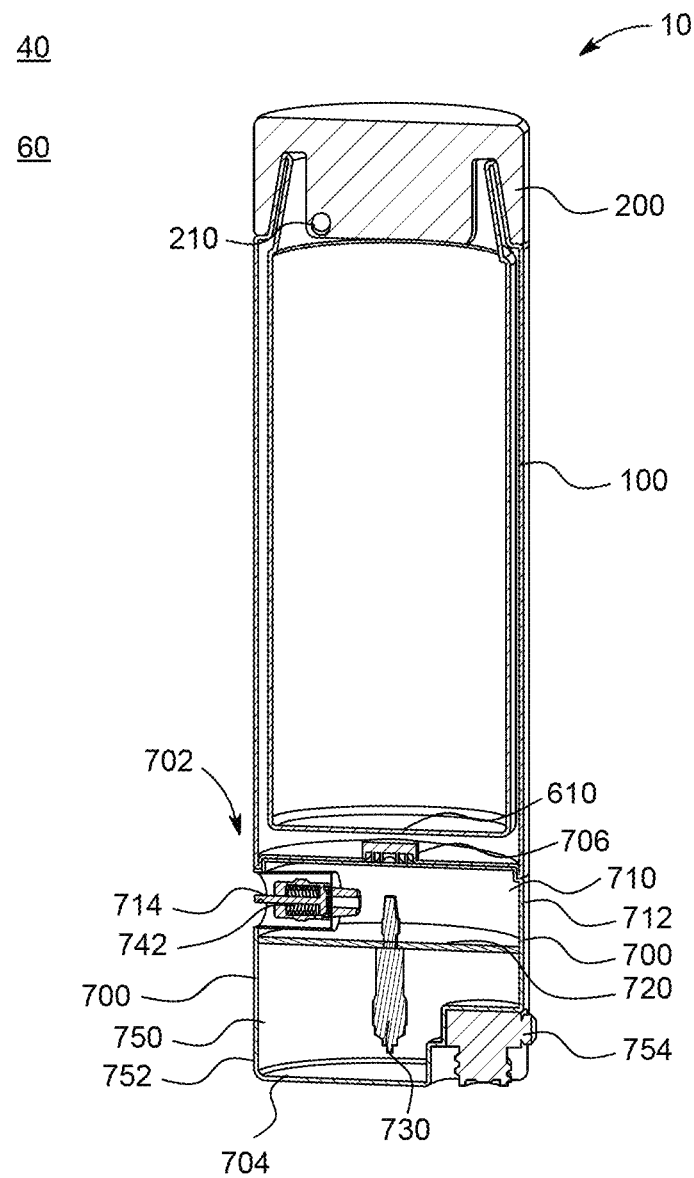
FIG. 13 is a longitudinal side cross-section view of the bottle in FIG. 12 according to embodiments.

In some embodiments, bottle 10 may include one or more sensors. In some embodiments, the one or more sensors may be, for example, coupled to main body 100 and/or lid 200. The one or more sensors may provide data related to bottle 10 and/or its contents. The data may provide, for example, information on the integrity of bottle 10 and/or its contents, and/or the information on contents disposed in bottle 10. The one or more sensors may provide, for example, data related to the position of bottle 10 (e.g., open/fill position 20, open/drink position 30, or closed/storage position 40), location of bottle 10, temperature of the contents disposed in bottle 10, or the fill level of bottle 10. The one or more sensors may include level sensor(s) 118 (e.g., conductivity level sensor(s) shown in FIG. 4), location sensor(s) (not shown), open position sensor(s) 210 coupled to the lid 200 (e.g., to the inside of lid 200 as shown in FIGS. 9 and 13), and/or temperature sensor(s) (not shown). It is to be appreciated that bottle 10 may include additional sensor(s) and/or input(s) in any component of bottle 10 not described herein (e.g., conductivity sensors or other TDS sensors to determine TDS, accelerometers to determine position, timers and/or clocks to determine time of storage, UV light sensors to determine sanitation effectiveness, pressure switch to remedy over pressurization, automatic pressure relief input, etc.).

In some embodiments, location sensor(s) may include Global Positioning System (GPS) receivers. In some embodiments, level sensor(s) 118 may also signal the amount of consumption by a user. For example, a reduction in the fill level of bottle 10 may signal that contents were consumed. In some embodiments, open position sensor(s) 210 may signal when bottle 10 is in an open position (e.g., open/fill position 20 or open/drink position 30). For example, open position sensor(s) may include, for example, an accelerometer, a magnetic field sensor, a gyroscope, etc. that may signal when lid 200 is removed from main body 100 and/or opening 208 is exposed.

Figure 6:
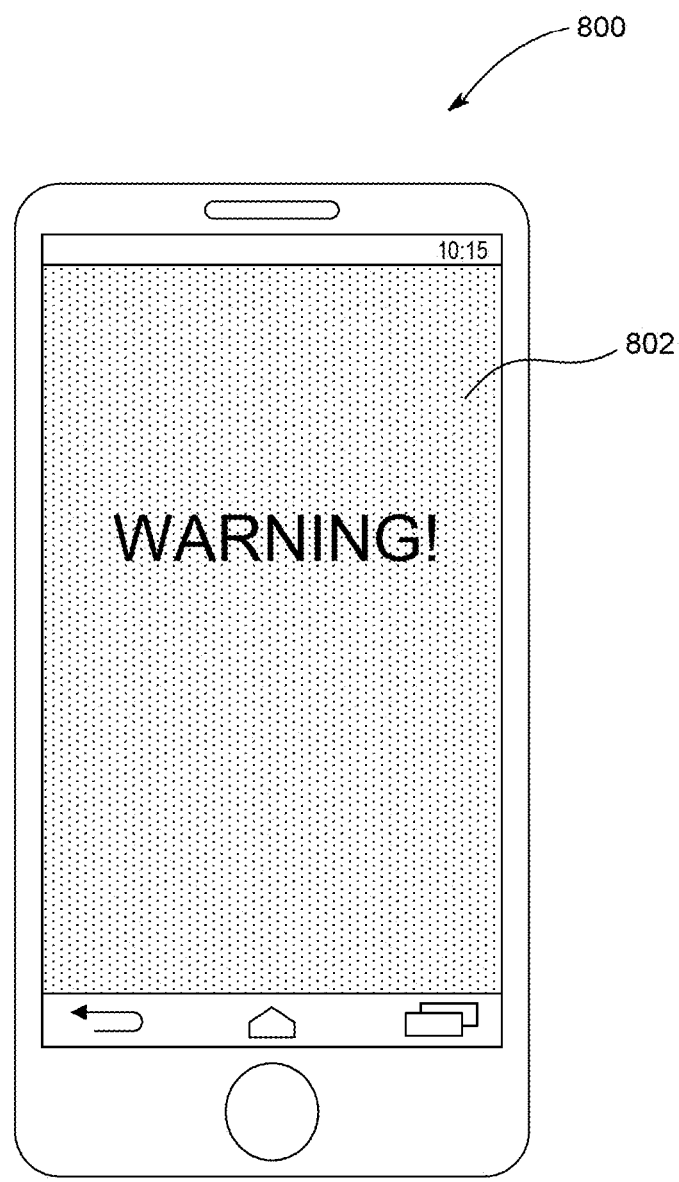
FIG. 6 is a user device according to embodiments.
Figure 17:
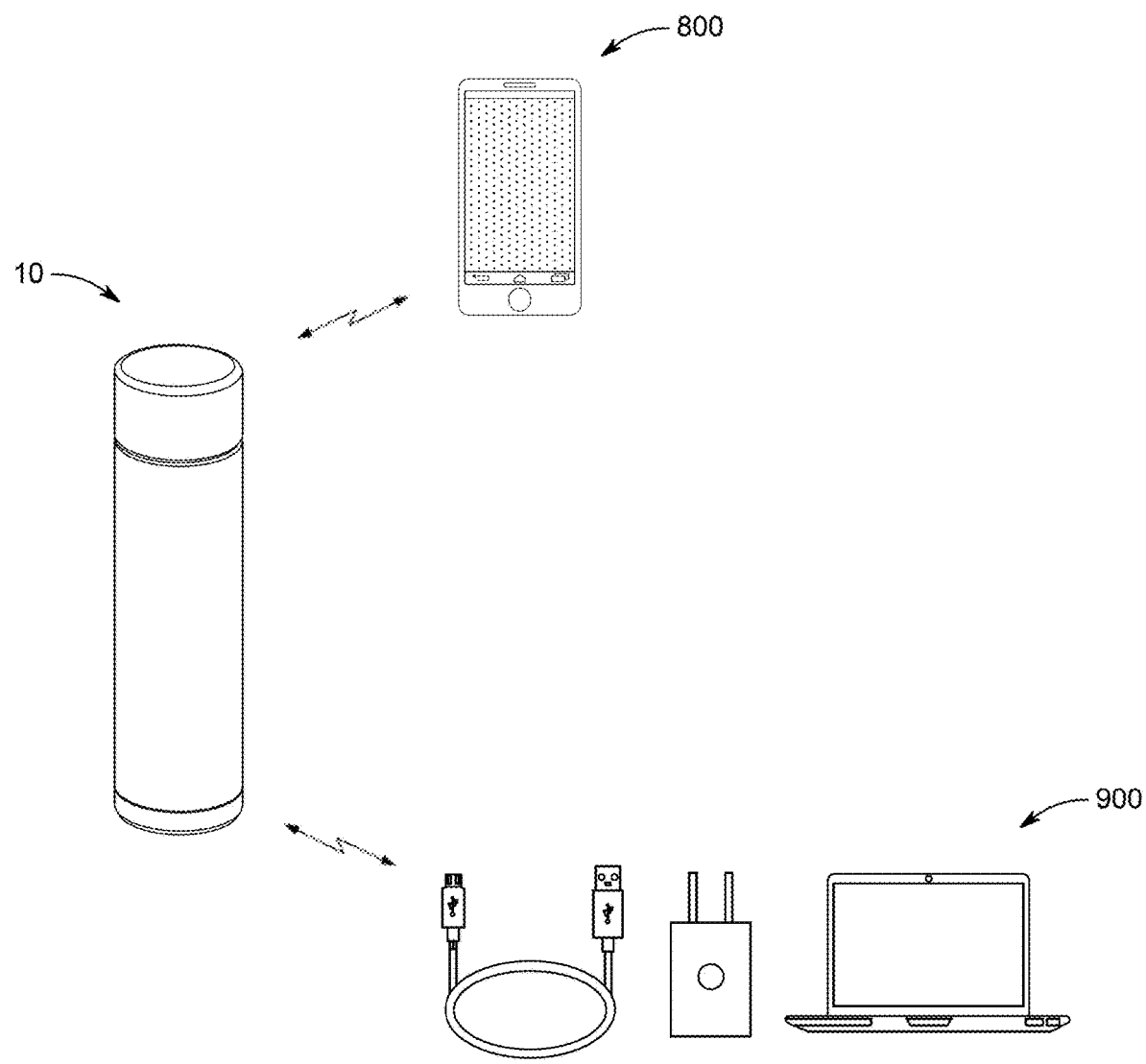
FIG. 17 is a schematic view of wireless communication for a bottle according to embodiments.

With reference to FIGS. 3 and 5, in some embodiments, bottle 10 may include one or more indicator(s) 300 that display information related to the data. In some embodiments, indicator(s) 300 may additionally be provided on a separate device, such as a user device 800 (FIGS. 6 and 17). On bottle 10, indicator(s) 300 may comprise one or more lights (e.g., LEDs) coupled to main body 100 and/or lid 200. In some embodiments, indicator(s) 300 may include a single light, a multi-colored light, or an electronic display. In some embodiments, indicator(s) 300 may be integrated with exterior surface 114 such that it may illuminate the exterior surface 114 of main body 100. In some embodiments, indicator(s) 300 may be integrated with lid 200 such that it may illuminate lid 200.

Further, indicator(s) 300 may be configured to display certain colors corresponding to the data. In some embodiments, a desired temperature and/or fill level, for example, may be defined (e.g., via an input on bottle 10 or a separate device, such as user device 800) such that indicator(s) 300 provide a display signaling that the contents disposed in bottle 10 do not comply with the desired criteria. For example, a desired temperature and/or fill level may be defined. If the contents disposed in bottle 10 do not meet the defined temperature and/or fill level, indicator(s) 300 may display a red light. If the contents disposed in bottle 10 reach the defined temperature and/or fill level, indicator(s) 300 may display, for example, a green light.

In some embodiments, indicator(s) 300 may turn on or off, or flash on and off, based on the defined criteria. Similarly, in some embodiments, indicator(s) 300 may brighten or dim based on the defined criteria. For example, if the contents disposed in bottle 10 reach a temperature that is warmer than a defined temperature, indicator(s) 300 may turn off, or flash on and off, to signal that heating is complete. Similarly, if the contents disposed in bottle 10 reach a temperature that is colder than a defined temperature, indicator(s) 300 may dimly illuminate, or display a related graphic to signal that cooling is complete. Additionally, if the contents disposed in bottle 10 reach a defined fill level, indicator(s) 300 may turn off, or flash on and off, to signal that bottle 10 may be filled as desired. Similarly, if the contents disposed in bottle 10 fall below a defined minimum fill level of bottle 10, indicator(s) 300 may turn on, or flash, on and off to signal that bottle 10 may be filled. In some embodiments, as the fill level of bottle 10 decreases, indicator(s) 300 may progressively dim, or display a related graphic to signal the decreasing fill level of bottle 10.

In some embodiments, main body 100 may include battery 126 (not shown) which may be used, for example, to power sensor(s) and/or indicator(s) 300. Similarly, lid 200 may include battery 212. In some embodiments, battery 126 and battery 212 are configured to be rechargeable (e.g., via a USB cable as shown in FIG. 17). In some embodiments, the one or more sensors are self-contained such that they include a power source.

Figure 18:
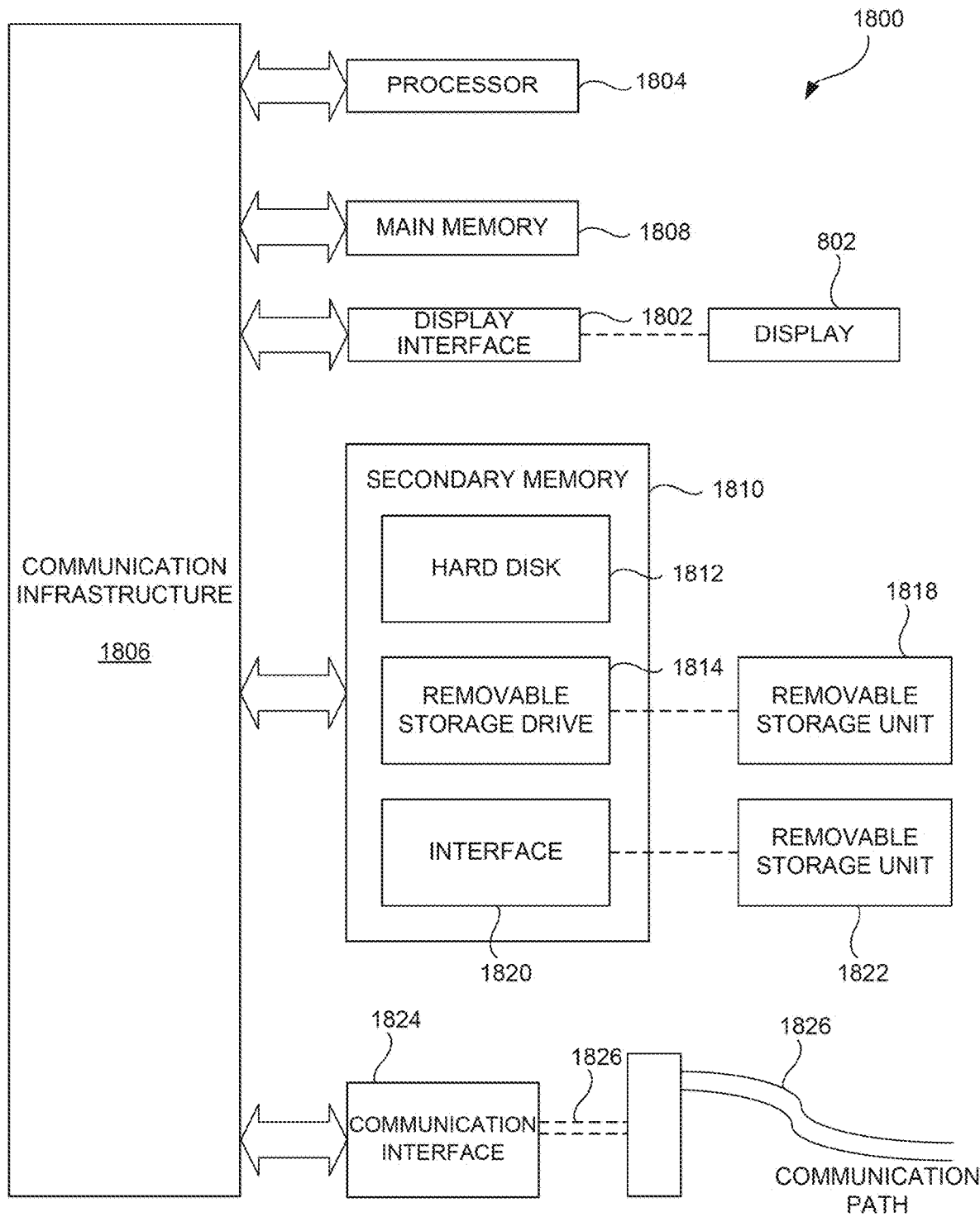
FIG. 18 is a schematic block diagram of an exemplary computer system according to embodiments.

With reference to FIGS. 6 and 17-18, for example, in some embodiments, bottle 10 may communicate with user device 800. User device 800 may be, for example, a smartphone, smart watch, smart ring, a tablet, a computer (e.g., laptop 900), or other suitable electronic device. In some embodiments, user device 800 may include a display 802 that supports a plurality of graphical user interfaces (GUIs). In some embodiments, bottle 10 may include a QR code, a Near Field Communication (NFC) tag, and/or a bar code for communication with user device 800.

Figure 7:
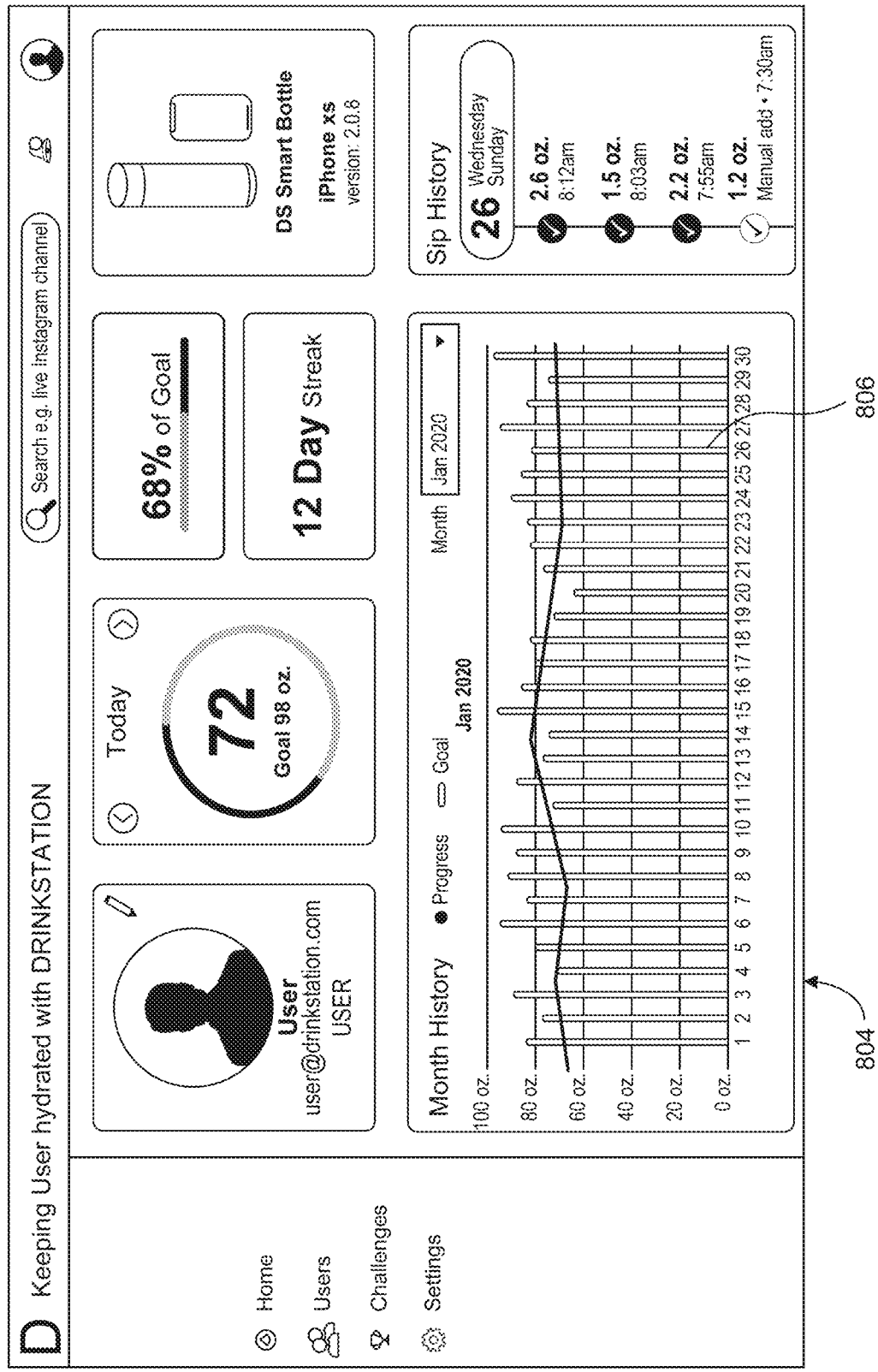
FIG. 7 is a control screen for a bottle according to embodiments.

As shown in FIG. 7, a display 802 may support bottle GUI 804 related to bottle 10. Bottle GUI 804 may provide user and user device information as well. Bottle GUI 804 may be set for multiple users, each with her/his body characteristics and water consumption goal. Further, bottle GUI 804 may provide tactile inputs (e.g., touchscreen), or equivalents thereof, that communicate with bottle 10 (e.g., input desired criteria on temperature and/or fill level). In some embodiments, the one or more sensors, such as level sensor(s) 118, location sensor(s), and/or open position sensor(s) 210, may communicate data to user device 800. In some embodiments, user device 800 provides indicator(s) 300 related to the data. For example, bottle GUI 804 may correspondingly display water consumption data 806, water level data, bottle 10 position data, and/or location data in real time. Water consumption data 806 may further include, for example, historical data from a period of time (e.g., the day or the month), goal realization by amount and/or percentage (e.g., data as compared to inputted criteria on daily consumption goal), and/or goal completion information (e.g., streak data indicating the number of days in a row that the user's goal was realized). Water consumption data 806 also may allow comparison of water consumption between multiple users and sharing of this information. For example, a parent or guardian may obtain information on how much water their child consumes while at school or during sporting activities.

In some embodiments, user device 800 may further include a GPS receiver that processes the location data communicated by GPS location sensor(s). The GPS receiver may process the location data in real time and produce time-stamped waypoints that include a time, a latitude, and a longitude.

In some embodiments, user device 800 may provide information related to safety. Since a user may not have bottle 10 in their possession at all times, it is important to provide the ability for monitoring the safety of bottle 10 and alerting the user of unsafe conditions. For example, a user may place the bottle on a table and walk away, returning after some time. While not in the line of sight of the user, bottle 10 and its contents may be vulnerable in that bottle 10 may be controllable by someone other than the user and/or the contents may be exposed. Safety system GUI may be accessible via user device 800 and may, for example, control a safety system related to bottle 10 and provide data regarding the safety system. In some embodiments, safety system 816 (not shown) may be activated via safety system GUI. Safety system 816 may provide periodic or constant monitoring of the safety of bottle 10. Similarly, safety system 816 may be deactivated via safety system GUI such that the safety of bottle 10 is not monitored.

In some embodiments, if safety system 816 is active, safety system 816 may determine if bottle 10 is in either a safe or an unsafe state. Bottle 10 may be in a safe state when both bottle 10 and the contents disposed in bottle 10 are controlled by the user and/or another while the user is present. The user is present when bottle 10 is connected to user device 800. For example, bottle 10 may remain in a safe state when a user temporarily gives bottle 10 to another proximate to them (e.g., for refilling in a common area or a coffee shop). In an unsafe state, safety system 816 may direct safety system GUI to display a warning message (FIG. 6), optionally requiring acknowledgement. In some embodiments, the warning message may be followed by an audio signal or haptic feedback on user device 800. In other embodiments, a push notification may be provided to user device 800, optionally requiring acknowledgement.

In some embodiments, residual pressure relief safety, UV light sanitization, and/or anti-microbial coating may promote the safety of bottle 10. Safety system 816 may monitor bottle 10 for these criteria and indicate when bottle 10 is in an unsafe state based on these criteria, e.g., when the contents of bottle 10 are pressurized above a predetermined threshold, when UV light sanitization is ineffective, and/or when the anti-microbial coating is ineffective. In some embodiments, the unsafe state may be when the temperature of the contents disposed in bottle 10 are above a predetermined threshold. In some embodiments, the unsafe state may be when the contents of bottle 10 have been stored for a length of time that is over a predetermined threshold. For example, dairy products may reach a spoiled state after a period of time, after which consuming them is harmful to the user's health. The unsafe state may additionally include when bottle 10 is empty. For example, it may be desirable to have water available at all times such that bottle 10 being empty is harmful to the user's health. In some embodiments, the unsafe state may be when the TDS measurement is above a predetermined threshold such that an unacceptable level of dissolved solids are present in the contents disposed in bottle 10. The contents being in a TDS state may be hazardous to the user's health.

In some embodiments, the unsafe state may indicate that bottle 10 and/or the contents disposed in bottle 10 are vulnerable to tampering and/or have been subject to tampering (e.g., control of the bottle by someone other than the user and/or exposure of the bottle's contents). Bottle 10 may be in an unsafe state when either bottle 10 or the contents disposed in bottle 10 are for example, controlled by another while the user is not present. The user is not present when bottle 10 is disconnected from user device 800. In some embodiments, bottle 10 may enter an unsafe state when a user moves sufficiently far away—at a pre-set distance— from where bottle 10 is located such that bottle 10 disconnects from user device 800. In some embodiments, bottle 10 may enter an unsafe state when a user moves sufficiently far away from where bottle 10 is located such that bottle 10 disconnects from user device 800 and bottle 10 is in an open position (e.g., open/fill position 20 or open/drink position 30). In some embodiments, bottle 10 may enter an unsafe state when a user moves sufficiently far away from where bottle 10 is located such that bottle 10 disconnects from user device 800 and bottle 10 moves from a closed position to an open position (e.g., from closed/storage position 40 to open/fill position 20, or from closed/storage position 40 to open/drink position 30). In some embodiments, for example, bottle 10 may enter an unsafe state when a user moves sufficiently far away from where bottle 10 is located such that bottle 10 disconnects from user device 800 and bottle 10 moves from an open position to another open position (e.g., from open/fill position 20 to open/drink position 30 or vice versa). This may include if the open position is a result of opening 208 on lid 200 being exposed. In some embodiments, the indication of an unsafe state presents when device 800 returns in proximity to the bottle 10.

User device 800 may use data gathered by the one or more sensors of bottle 10 to determine the safety status of bottle 10 and/or the contents disposed in bottle 10. For example, user device 800 may determine when bottle 10 is in or enters a closed position or open position via open position sensor(s) 210 on lid 200. Further, user device 800 may determine when the contents disposed in bottle 10 may have been changed via level sensor(s) 118 such that bottle 10 may be in an unsafe state. For example, bottle 10 may be more or less filled such that the contents disposed inside may have been manipulated. Additions may, for example, indicate that a foreign substance has been added that may be unsafe to consume. Temperature sensor(s) may be used to determine if a foreign substance has been added as well, by indicating a sudden change in the temperature of the contents. User device may, also determine that bottle 10 has been moved via GPS sensor(s). This may signal that bottle 10 may be in an unsafe state if the user is away from bottle 10 when it is moved.

In some embodiments, user device 800 and/or bottle 10 may provide indicator(s) 300 related to safety status data. For example, if bottle 10 is in an unsafe state, indicator(s) 300 may provide an unsafe indication (e.g., a red LED). In some embodiments, the unsafe indication displayed by indicator(s) 300 may be removed if bottle 10 and/or the contents disposed in bottle 10 enter a safe state. In some embodiments, indicator(s) 300 may remove an unsafe indication when safety notification is cleared or otherwise acknowledged.

In some embodiments, for example, safety system GUI may display safety status data that indicates the safety status of bottle 10 and/or the contents disposed in bottle 10. In some embodiments, safety status data may include indicator(s) 300 related to the state of bottle 10 and/or the contents disposed in bottle 10 (e.g., with text, colors, flashes, sounds, etc.). In some embodiments, if an unsafe state is indicated on safety system GUI (e.g. with text, colors, flashes, sounds, blinking/pulsing/beeping indicator etc.), safety status data may further include information related to which sensor(s) of bottle 10 caused the unsafe state determination (e.g., that bottle 10 is in an open position while the user is away, the temperature and/or fill level of the contents changed signaling the presence of a foreign substance, the contents are pressurized above a predetermined threshold, the anti-microbial coating is insufficient, the contents are in a TDS state, etc.). In some embodiments, the information may include how bottle 10 is in an open position. For example, safety status data may show that opening 208 may be exposed (e.g., a tab on lid 200 has been removed from lid 200 or a straw has been removed from opening 208). In some embodiments, indicator(s) 300 related to the state of bottle 10 and/or the contents disposed in bottle 10 and related safety status data may be provided to the user in a text message to user device 800.

User device 800 may, in some embodiments, provide a safety notification to the user indicating, for example, an unsafe state of bottle 10 via display 802 and/or safety system GUI. In some embodiments, the unsafe indication on safety system GUI is removed if bottle 10 and/or the contents disposed in bottle 10 enter a safe state. In some embodiments, the unsafe indication is removed by a clearing or acknowledging action of safety notification. In some embodiments, the unsafe indication remains until safety notification is cleared or otherwise acknowledged. In an unsafe state, user device 800 may display a warning message, optionally requiring acknowledgement. In some embodiments, the warning message may be followed by an audio signal and/or haptic feedback on user device 800. In other embodiments, a push notification may be provided to user device 800, optionally requiring acknowledgement. Notifications may generally be stored in the user's app until cleared by user.

Figure 8:
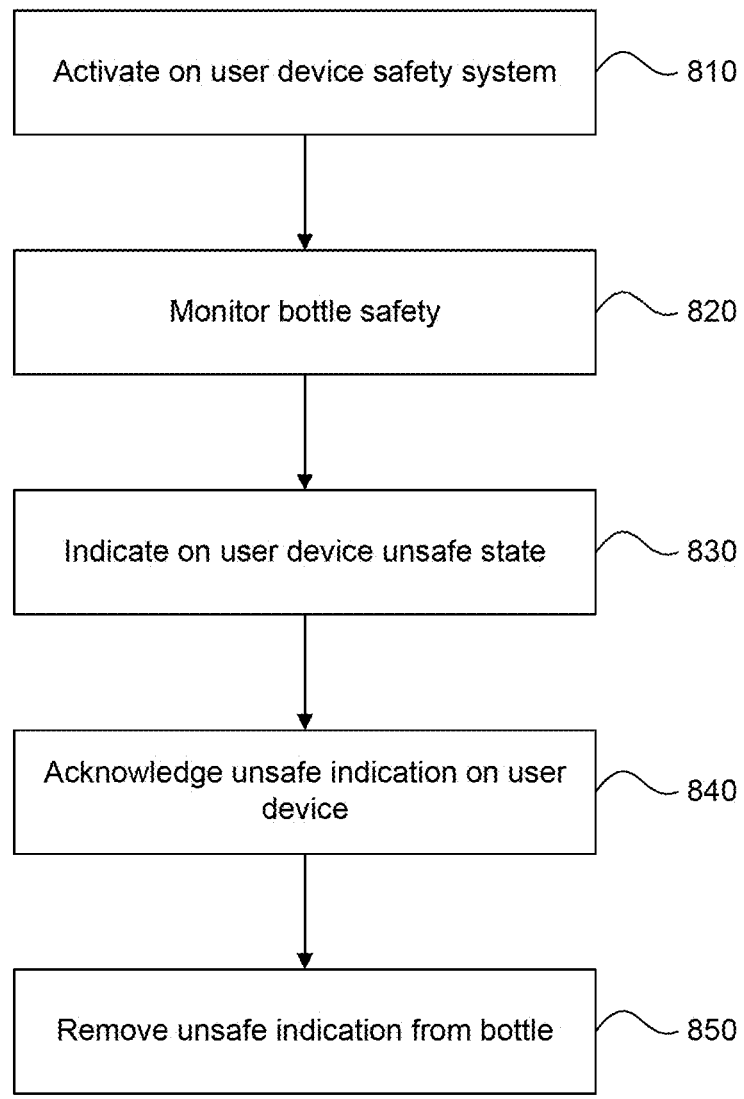
FIG. 8 is a flow chart of a method for operating a safety system of a bottle according to embodiments.

Methods of operating the safety system disclosed herein are also contemplated and include methods of operation described above. FIG. 8 shows an example block diagram illustrating aspects of a method of operating a safety system for a bottle (e.g., the embodiments shown in FIGS. 1-18).

In some embodiments, user device 800 may be a computing device that controls a safety system related to bottle 10 during normal operation (e.g., when safety system is activated). As described above, user device 800 may include a display 802 that supports GUIs, including, for example, bottle GUI 804 related to bottle 10 and safety system GUI. Bottle 10 may communicate to user device 800 data gathered by sensor(s) such as level sensor(s) 118, open position sensor(s) 210, and GPS sensor(s). Bottle GUI 804 may correspondingly display, for example, water consumption data 806, water level data, bottle 10 position data, location data, and safety status data.

For example, in some embodiments, at step 810, safety system may be activated via safety system GUI on user device 800. The activation 810 on user device 800 of a safety system is based on detecting the distance between bottle 10 and user device 800. When it exceeds a pre-determined distance activation happens automatically (unless this function is deactivated by user on user's app). In some embodiments, at step 820, a method of controlling safety system includes monitoring bottle 10 safety for failure of safe conditions that such that bottle 10 enters an unsafe state. User device 800 may process safety status data to determine the state of bottle 10. The unsafe state may include when a user moves sufficiently far away from where bottle 10 is located such that bottle 10 disconnects from user device 800. In addition, it may also detect—remotely or when device 800 is brought back in proximity of bottle 10—if bottle 10 is or was in an open position (e.g., open/fill position 20 or open/drink position 30). If bottle 10 enters an unsafe state, in some embodiments, step 830 provides indicator(s) 300 on user device 800 and/or on bottle 10 that signal the unsafe state. For example, if an unsafe state is signaled by safety status data on safety system GUI, similarly, indicator(s) 300 will provide an unsafe indication (e.g., a red LED) on bottle 10.

In some embodiments, at step 840, a user may acknowledge the unsafe state signaled by safety status data on user device 800. The acknowledgement may, for example, be made via a tactile input on safety system GUI. In some embodiments, in step 850, this user acknowledgement may remove the unsafe indication provided by indicator(s) 300 on bottle 10.

Figure 10:
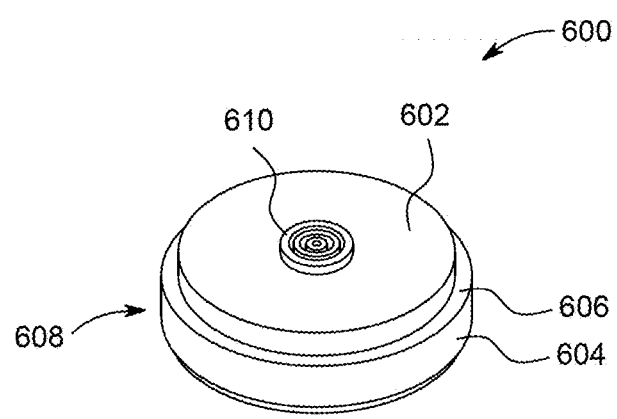
FIG. 10 is a perspective view of a heating accessory according to embodiments.

Example accessories will now be described in detail. As shown in FIGS. 9-10, in some embodiments, a heating accessory 600 may be configured to removably attach to base portion 104 of main body 100. Heating accessory may include the components and configuration of bottom/accessory 500, described above. Further, heating accessory 600 may, for example, provide heating to the contents disposed in bottle 10. In some embodiments, heating accessory 600 includes a top portion 602, a base portion 604, a sidewall 606, a battery 608, and a locking element 610.

In some embodiments base portion 104 of main body 100 may be configured to receive heating accessory 600 such that base portion 104 completely covers at least top portion 602 (e.g., base portion 104 may be threaded and/or of a larger diameter than at least top portion 602). At least top portion 602 may be correspondingly configured (e.g., top portion may be threaded and/or of a smaller diameter than base portion 104). For example, heating accessory 600 may screw, or simply be inserted into, base portion 104. In some embodiments, the attachment may be a bayonet threaded turn, e.g., a ⅛-¼ turn. In some embodiments, base portion 104 may receive heating accessory 600 after a predetermined force is applied to it.

In some embodiments, heating accessory 600 need only be inserted into the recess of base portion 104 to achieve electrical continuity for operation. In some embodiments, locking element 610 may correspond to locking element 128 (FIG. 1) of main body 100. Engagement of locking element 610 with locking element 128 (e.g., a retractable button, such as a spring button, engaging with a slot) may place bottle 10 in the locked/accessorized position 60. In some embodiments, a user may receive feedback, such as a tactile, visible, or audible signal, when the locking elements engage such that the user is aware that bottle 10 is in locked/accessorized position 60. In some embodiments, a LED on bottle 10 may illuminate (normally in red) to show that bottle 10's contents are been warmed up.

In some embodiments, battery 608 may be in position to power a flexible circuit 124 of main body 100 when bottle 10 is in locked/accessorized position 60. In some embodiments, flexible circuit 124 may be disposed between inner sidewall 108 and outer sidewall 110. When powered, flexible circuit 124 may provide heating to the contents disposed in bottle 10. Further, in some embodiments, battery 608 is configured to be rechargeable (e.g., via a USB cable as shown in FIG. 17). In some embodiments, battery 608 may be recharged while remaining within heating accessory 600. Also, in some embodiments, battery 608 may be recharged while heating accessory 600 is attached to bottle 10. Further, in some embodiments, top portion 602 may be closed. In some embodiments, heating accessory 600 may be an integral part of the bottle and cannot be removed—so that base portion 104 may be open such that top portion 602 provides a sealed bottom for main body 100. Interior surface 112 of bottle reservoir 116 may be wrapped with flexible electrical resistance—heating—foil that is connected to 124.

Figure 11:
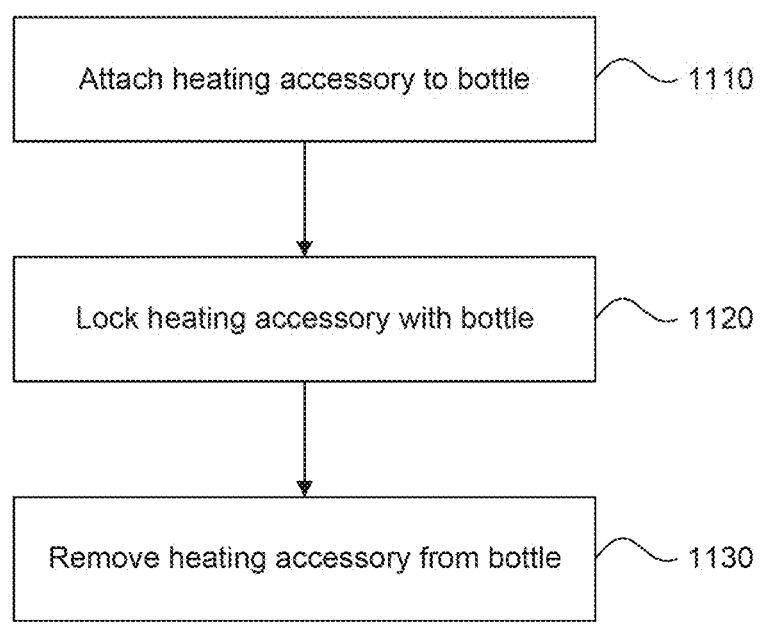
FIG. 11 is a flow chart of a method for using a bottle with a heating accessory according to embodiments.

Methods of operating the heating accessory disclosed herein are also contemplated and include methods of operation described above. FIG. 11 shows an example block diagram illustrating aspects of a method of operating a heating accessory for a bottle (e.g., the embodiments shown in FIGS. 1-11 and 17-18). As described above, bottle 10 may include main body 100 and bottom/accessory 500. Main body 100 may include reservoir 116 in which contents for consumption are disposed and stored. Bottom/accessory 500 may be configured to change a characteristic of the contents disposed in bottle 10. For example, heating accessory 600 may provide heating the contents disposed in bottle 10. At step 1110, heating accessory 600 may be attached to main body 100. For example, heating accessory 600 may screw into base portion 104 of main body 100. Base portion 104 may be threaded and/or of a larger diameter than top portion 602 of heating accessory 600. At least top portion 602 may be correspondingly configured. For example, top portion 702 may be threaded and/or of a smaller diameter than base portion 104.

Locking element 610 of heating accessory 600 may correspond to locking element 128 of main body 100. In step 1010, heating accessory 600 may attach to base portion 104 enough to engage locking element 610 with locking element 128 (e.g., a retractable button, such as a spring button, engages with a slot). In some embodiments, in step 1120, heating accessory 600 may lock into bottle 10 such that bottle 10 enters the locked/accessorized position 60. Once bottle 10 is in the locked/accessorized position 60, heating accessory 600 may heat the contents of bottle 10. Heating accessory 600 may contain a battery 608 which may power a flexible circuit 124 of main body 100. When powered, flexible circuit 124 may provide heating to the contents disposed in bottle 10. In some embodiments, flexible circuit 124 may extend throughout interior surface 112 of bottle reservoir 116. In some embodiments, user device 800 may monitor the temperature of the contents via data gathered by the one or more sensors coupled to bottle 10 which may include a temperature sensor. In some embodiments, in step 1130, a user may remove heating accessory 600 from bottle 10 when a desired temperature is reached. Battery 608 is configured to be rechargeable such that it may be charged when not in use, such as after step 1030. In some embodiments, heating accessory 600 may not have batteries and, instead, is electrically connected to a source of energy (e.g., through a power cord to a wall socket).

Figure 12:
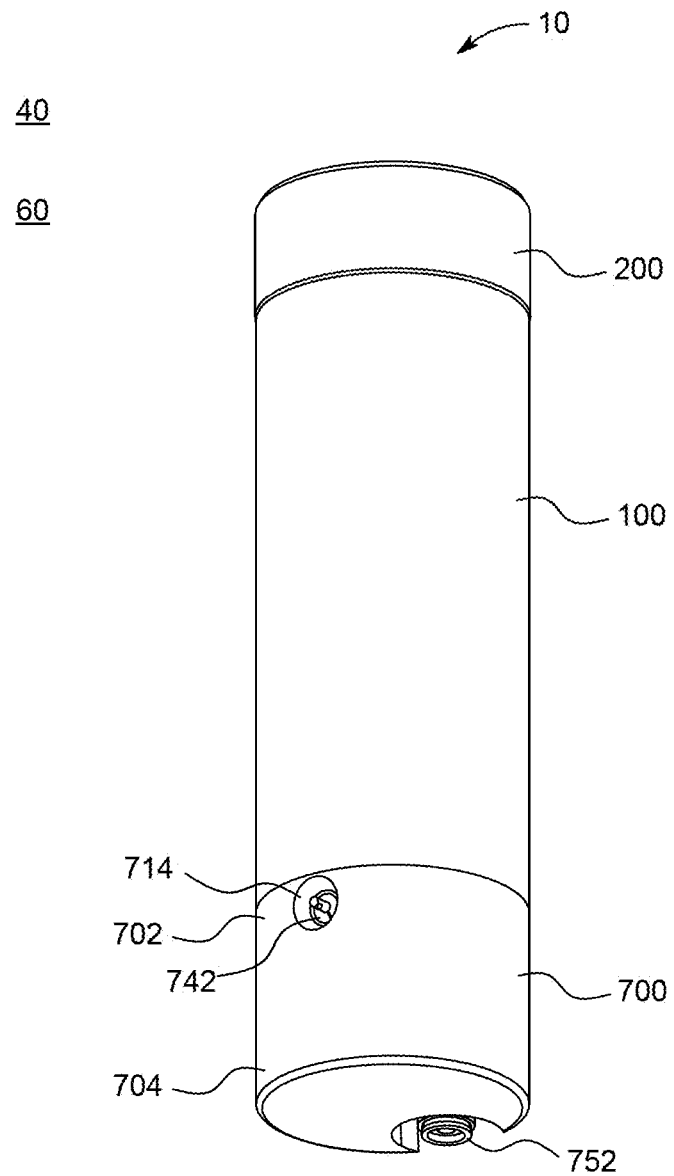
FIG. 12 is a perspective view of a bottle with a cooling accessory according to embodiments.

As shown in FIGS. 12-13, in some embodiments, a cooling accessory 700 may be configured to removably attach to base portion 104 of main body 100 of bottle 10. Cooling accessory may include the components and configuration of bottom/accessory 500, described above. Further, cooling accessory 700 may, for example, provide cooling to the contents disposed in bottle 10. In some embodiments, cooling accessory 700 includes a top portion 702, a base portion 704, and a locking element 706.

In some embodiments base portion 104 of main body 100 may be configured to receive cooling accessory 700 such that base portion 104 completely covers at least top portion 702 (e.g., base portion 104 may be threaded and/or of a larger diameter than at least top portion 702). At least top portion 702 may be correspondingly configured (e.g., contain threading and/or a smaller diameter than base portion 104). For example, cooling accessory 700 may screw into base portion 104. In some embodiments, the attachment may be a bayonet threaded turn, e.g., a ⅛-¼ turn. In some embodiments, base portion 104 may receive cooling accessory 700 after a predetermined force is applied to it.

In some embodiments, locking element 706 may correspond to locking element 128 of main body 100. Engagement of locking element 706 with locking element 128 (e.g., a retractable button, such as a spring button, engaging with a slot) may place bottle 10 in the locked/accessorized position 60. In some embodiments, a user may receive feedback, such as a tactile or audible signal, when the locking elements engage such that the user is aware that bottle 10 is in locked/accessorized position 60. In some embodiments, cooling accessory 700 may be in position to provide cooling to the contents disposed in bottle 10 while minimizing losses when bottle 10 is in locked/accessorized position 60.

Figure 14:
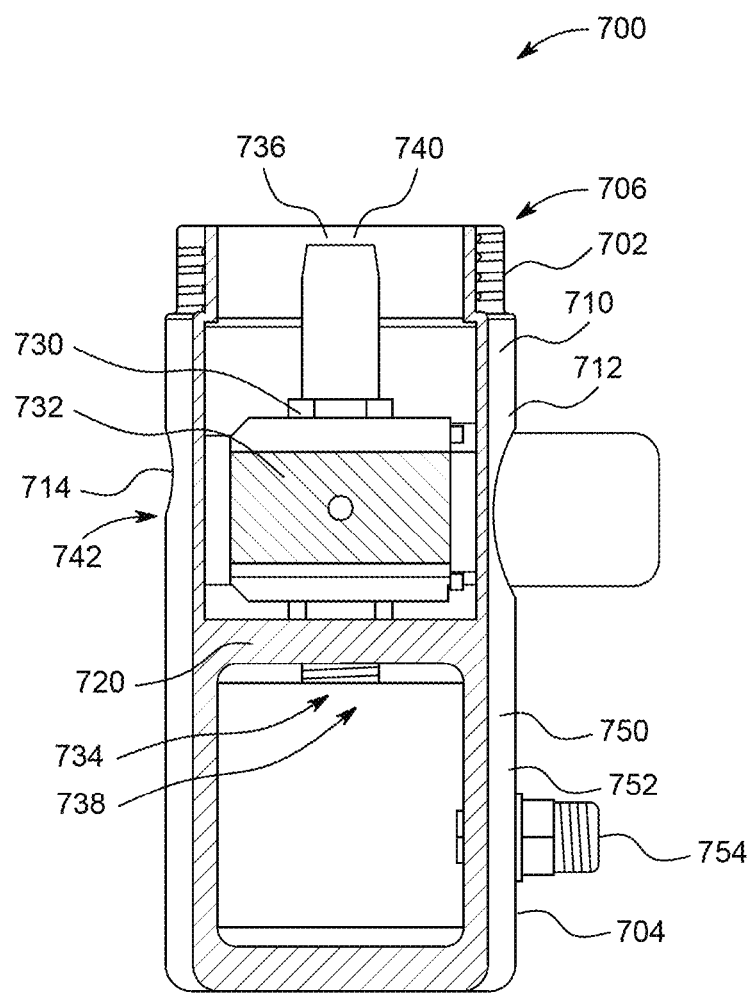
FIG. 14 is a longitudinal side cross-section view of a cooling accessory according to embodiments.

In some embodiments, top portion 702 may be open such that base portion 104 may be closed to provide a sealed bottom for main body 100. As shown in FIGS. 13-14, in some embodiments, cooling accessory 700 may further contain a top chamber 710 (e.g., an expansion chamber) and a bottom chamber 750 (e.g., a storage chamber) where top chamber 710 is arranged directly above bottom chamber 750. Top chamber 710 may be configured to provide expansion of a gas stored in bottom chamber 750 (e.g., carbon dioxide).

In some embodiments, for example, bottom chamber 750 may include a refilling valve 754. Refilling valve 754 may be configured to receive an input gas for storage in bottom chamber 750 (e.g., bottom chamber 750 may be charged with carbon dioxide). In some embodiments, refilling valve 754 may be configured to connect to carbon dioxide cylinders via an adapter. Cooling accessory 700 may be refillable with gas (e.g., carbon dioxide) at high pressure, via refilling valve 754, using the identical process adopted by those skilled in the art of refilling cylinders or tank with gas. In some embodiments, bottom chamber 750 may further include a sidewall 752. Sidewall 752 may be insulated such that a stored gas in bottom chamber 750 is retained. In some embodiments, base portion 704 is insulated. In some embodiments, base portion 704 may include at least part of bottom chamber 750 and sidewall 752. In some embodiments, an insulated layer 720 may be disposed between top chamber 710 and bottom chamber 750. Insulated layer 720 may contain a pressure regulating valve 730 that is partially disposed in both bottom chamber 750 and top chamber 710.

Figure 15:
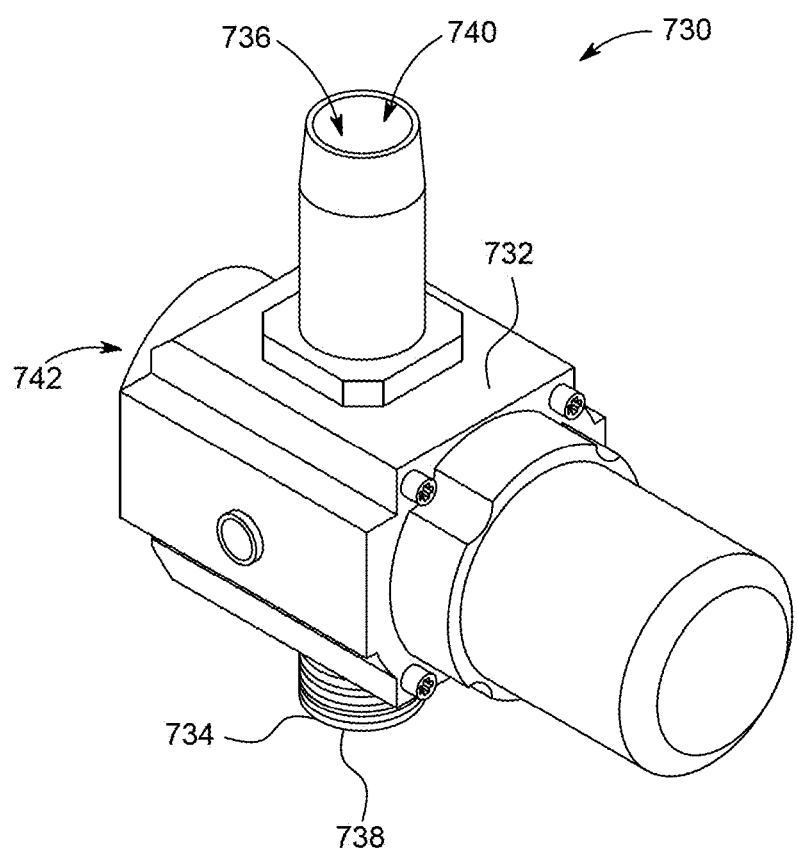
FIG. 15 is a perspective view of a pressure regulating valve for a cooling accessory according to embodiments.

With reference to FIG. 15, in some embodiments, pressure regulating valve 730 may be configured to receive a gas stored in bottom chamber 750 (e.g., carbon dioxide) via an inlet 734 (i.e., primary port). Inlet 734 may be substantially disposed in bottom chamber 750, accordingly. An expansion chamber 732 may retain the gas as it expands to the atmospheric pressure. Pressure regulating valve 730 may contain an outlet 736 (i.e., secondary port) through which the gas is released. Outlet 736 may be substantially disposed in top chamber 710. In some embodiments, a pressurizing mechanism such as a diaphragm may act on the gas within expansion chamber 732. Further, inlet 734 may correspond with inlet pressure sensor(s) 738 (i.e., sensor(s) for the primary). Outlet 736 may correspond with outlet pressure sensor(s) 740 (i.e., sensor(s) for the secondary). The inlet and outlet pressures may be obtained and communicated to a user with the same components and the same methods as described above. Pressure regulating valve 730 may further contain safety valve(s) 742. This valve system is a workable option for those skilled in the art.

With reference to FIG. 13-14, in some embodiments, top chamber 710 may include sidewall 712 that provides insulation, such that the output from pressure regulating valve 730 is retained. This also provides the benefit of avoiding freezing of the hands of the user. In some embodiments, top chamber 710 may further include a plurality of safety opening(s) 714 that correspond with safety valve(s) 742. The expanded gas is able to escape via safety valve(s) 742 and safety opening(s) 714 such that top chamber 710 remains safe to use. In some embodiments, top portion 702 may include at least part of top chamber 710 and sidewall 712. Further, top portion 702 may be open such that top chamber 710 is unsealed. Accordingly, heat exchange occurs where top portion 702 and base portion 104 are in communication. The expansion of carbon dioxide to atmospheric pressure provides cooling to the contents of bottle 10.

Figure 16:
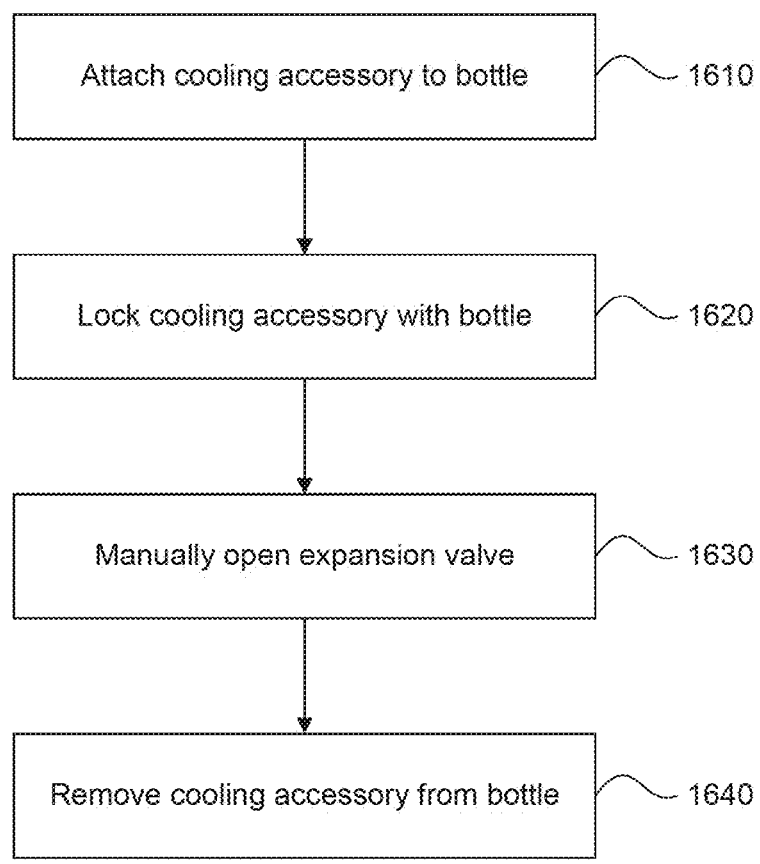
FIG. 16 is a flow chart of a method for using a bottle with a cooling accessory according to embodiments.

Methods of operating the cooling accessory disclosed herein are also contemplated and include methods of operation described above. FIG. 16 shows an example block diagram illustrating aspects of a method of operating a cooling accessory for a bottle (e.g., the embodiments shown in FIGS. 1-8 and 12-18). As described above, bottle 10 may include main body 100 and bottom/accessory 500. Main body 100 may include reservoir 116 in which contents for consumption are disposed. Bottom/accessory 500 may be configured to change a characteristic of the contents disposed in bottle 10. For example, cooling accessory 700 may provide chilling the contents disposed in bottle 10. At step 1610, cooling accessory 700 may be attached to main body 100. For example, cooling accessory 700 may screw into base portion 104 of main body 100. Base portion 104 may be threaded and/or of a larger diameter than top portion 702 of cooling accessory 700. At least top portion 702 of cooling accessory 700 may be correspondingly configured. For example, top portion 702 may be threaded and/or of a smaller diameter than base portion 104.

Locking element 706 of cooling accessory 700 may correspond to locking element 128 of main body 100. In step 1610, cooling accessory 700 may attach to base portion 104 enough to engage locking element 610 with locking element 128 (e.g., a retractable button, such as a spring button, engages with a slot). In some embodiments, in step 1620, cooling accessory 700 may lock into bottle 10 such that bottle 10 enters the locked/accessorized position 60. In some embodiments, a user may receive feedback, such as a tactile or audible signal, when the locking elements engage such that the user is aware that bottle 10 is in locked/accessorized position 60. Once bottle 10 is in the locked/accessorized position 60, the user may open pressure regulating valve 730 and cooling accessory 700 may cool the contents of bottle 10.

Cooling accessory 700 may contain a pressure regulating valve 730 which expands a gas such as carbon dioxide received from bottom chamber 750. Pressure regulating valve 730 may include an outlet 736 that releases the gas into top chamber 710. Further, cooling accessory 700 may be fully insulated aside from top portion 702 of cooling accessory 700. Top portion 702 may be in communication with base portion 104 of bottle 10 such that cooling accessory 700 provides cooling to the contents disposed in reservoir 116. In some embodiments, user device 800 may monitor the temperature of the contents via data gathered by sensor(s) coupled to bottle 10 which may include a temperature sensor. In some embodiments, in step 1620, the user may manually open pressure regulating valve 730. In some embodiments, in step 1640, a user may remove cooling accessory 700 from bottle 10 when the gas expansion has taken place. Bottom chamber 750 may include a refilling valve 754 that may be charged when not in use, such as after step 1640. Accordingly, bottom chamber 750 may recharge for a subsequent operation of cooling accessory 700. Immediately after step 1640, the user must violently shake the contents of bottle 10 in order to avoid that bottom parts of content freezes and in order to equally distribute the heat to all contents.

With reference to FIGS. 17-18, in some embodiments, bottle 10 may sense or communicate with user device 800 utilizing wired (e.g., via a USB cable) or wireless interfaces. In some embodiments, in order to support communication with other devices, bottle 10 may further contain one or more local wireless interface(s) 400. For example, local wireless interface(s) may include interfaces for 802.11x wireless standards, Bluetooth, 900 mHz communication or the like. Utilizing such technologies or similar technologies, bottle 10 may communicate with the user by sending and receiving data from user device 800, which may similarly contain wireless interface(s).

In some embodiments, bottle 10 may contain a radio-frequency identification (RFID) tag. In some embodiments, user device 800 may communicate data regarding bottle 10 such as sensor data, and if bottle 10 contains a RFID tag, the identifying information regarding bottle 10. Further, bottle 10 may, for example, connect with a plurality user devices that have identifying information related to bottle 10. In this way, multiple user devices (e.g., user devices of the same user or of users in the same household) that have identifying information related to bottle 10 may communicate with the same. In some embodiments, data collected and/or processed by user device 800 may be stored locally by user device 800, for example, within internal memory, or transmitted to a remote storage system (e.g., a cloud storage system) possibly in real time. The user devices may download the bottle app from the cloud. The user may open the bottle app on a user device 800 and pair user device 800 with one or more bottles (e.g., bottle 10). In various embodiments, bottle 10 may be connected to user device 800 using a QR code, barcode, NFC, etc.

FIG. 18 illustrates an exemplary computer system 1800 in which embodiments, or portions thereof, may be implemented as computer-readable code. A control unit 900 as discussed herein may be a computer system having all or some of the components of computer system 1800 for implementing processes discussed herein.

If programmable logic is used, such logic may execute on a commercially available processing platform or a special purpose device. One of ordinary skill in the art may appreciate that embodiments of the disclosed subject matter may be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments may be implemented in terms of this example computer system 1800. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1804 may be a special purpose or a general purpose processor device. As will be appreciated by persons skilled in the relevant art, processor device 1804 may also be a single processor in a multi-core/multiprocessor system, such system operating alone, or in a cluster of computing devices operating in a cluster or server farm.

Processor device 1804 is connected to a communication infrastructure 1806, for example, a bus, message queue, network, or multi-core message-passing scheme.

Computer system 1800 also includes a main memory 1808, for example, random access memory (RAM), and may also include a secondary memory 1810. Secondary memory 1810 may include, for example, a hard disk drive 1812, or removable storage drive 1814. Removable storage drive 1814 may include a floppy disk drive, a magnetic tape drive, an optical disk drive, a flash memory, or the like. The removable storage drive 1814 reads from and/or writes to a removable storage unit 1818 in a well-known manner. Removable storage unit 1818 may include a floppy disk, magnetic tape, optical disk, a universal serial bus (USB) drive, etc. which is read by and written to by removable storage drive 1814. As will be appreciated by persons skilled in the relevant art, removable storage unit 1818 includes a computer usable storage medium having stored therein computer software and/or data.

Computer system 1800 (optionally) includes display 802 (which may include input and output devices such as keyboards, mice, etc.) that forwards graphics, text, and other data from communication infrastructure 1806 (or from a frame buffer not shown) for display on display 802.

In alternative implementations, secondary memory 1810 may include other similar means for allowing computer programs or other instructions to be loaded into computer system 1800. Such means may include, for example, a removable storage unit 1822 and an interface 1820. Examples of such means may include a program cartridge and cartridge interface (such as that found in video game devices), a removable memory chip (such as an EPROM, or PROM) and associated socket, and other removable storage units 1822 and interfaces 1820 which allow software and data to be transferred from the removable storage unit 1822 to computer system 1800.

Computer system 1800 may also include a communication interface 1824. Communication interface 1824 allows software and data to be transferred between computer system 1800 and external devices. Communication interface 1824 may include a modem, a network interface (such as an Ethernet card), a communication port, a PCMCIA slot and card, or the like. Software and data transferred via communication interface 1824 may be in the form of signals, which may be electronic, electromagnetic, optical, or other signals capable of being received by communication interface 1824. These signals may be provided to communication interface 1824 via a communication path 1826. Communication path 1826 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 1818, removable storage unit 1822, and a hard disk installed in hard disk drive 1812. Computer program medium and computer usable medium may also refer to memories, such as main memory 1808 and secondary memory 1810, which may be memory semiconductors (e.g. DRAMs, etc.).

Computer programs (also called computer control logic) are stored in main memory 1808 and/or secondary memory 1810. Computer programs may also be received via communication interface 1824. Such computer programs, when executed, enable computer system 1800 to implement the embodiments as discussed herein. In particular, the computer programs, when executed, enable processor device 1804 to implement the processes of the embodiments discussed here. Accordingly, such computer programs represent controllers of the computer system 1800. Where the embodiments are implemented using software, the software may be stored in a computer program product and loaded into computer system 1800 using removable storage drive 1814, interface 1820, and hard disk drive 1812, or communication interface 1824.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The foregoing description of the specific embodiments will so fully reveal the general nature of the invention(s) that others may, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A resealable bottle system, comprising:
   a resealable bottle having a main body;
   a lid removably attached to the main body and comprising an indicator that displays data related to the resealable bottle system, the data comprising temperature data; and
   an accessory removably attached to the main body and configured to cool contents of the resealable bottle, the accessory comprising:
     a first chamber configured to be an expansion chamber;
     a second chamber configured to be a gas storage chamber, the second chamber disposed in the first chamber and comprising an insulated sidewall and an insulated base portion; and
     an insulated layer disposed in the second chamber and configured to contain a fluid at a high pressure.

2. The resealable bottle system of claim 1, wherein a top portion of the first chamber is open.

3. The resealable bottle system of claim 1, wherein the highly pressurized fluid is carbon dioxide.

4. A resealable bottle system, comprising:
a bottle comprising:
a main body comprising:
an inner sidewall;
an outer sidewall; and
a base portion;
an opening for receiving contents; and
a flexible circuit disposed between the inner sidewall and outer sidewall; and
an accessory removably attached to the base portion of the main body and configured to change a characteristic of the contents.

5. The resealable bottle system of claim 4, wherein the accessory comprises a threaded top portion.

6. The resealable bottle system of claim 4, wherein the accessory comprises a USB rechargeable battery that powers the flexible circuit.

7. The resealable bottle system of claim 4, wherein the characteristic is temperature.

8. The resealable bottle system of claim 4, wherein a locking element is engaged when the accessory is attached to the main body, and is disengaged when a predetermined minimum force is applied to remove the accessory from the main body.

9. The resealable bottle system of claim 4, further comprising a lid, wherein the lid is configured to close the opening for receiving contents and wherein the lid comprises an indication related to the characteristic.

10. The resealable bottle system of claim 4, wherein the lid comprises an opening for consuming contents.

11. The resealable bottle system of claim 8, wherein the locking element comprises a retractable button.

12. The resealable bottle system of claim 4, wherein the flexible circuit is configured to provide heating to the contents.

13. The resealable bottle system of claim 4, wherein the accessory is configured to change the characteristic of the contents while being attached to the base portion.

14. A resealable bottle system, comprising:
a resealable bottle having a main body;
a lid removably attached to the main body; and
an accessory removably attached to the main body and configured to cool contents of the resealable bottle, the accessory comprising:
a top chamber configured to be an expansion chamber;
a bottom chamber configured to be a gas storage chamber, the bottom chamber disposed below the top chamber and comprising an insulated sidewall and an insulated base portion; and
an insulated layer disposed between the top chamber and the bottom chamber.

15. The resealable bottle system of claim 14, wherein the main body comprises an indicator that displays data related to the resealable bottle system, the data comprising temperature data.

16. The resealable bottle system of claim 14, wherein the insulated layer comprises a pressure regulating valve that is partially disposed in both the top chamber and the bottom chamber.

17. The resealable bottle system of claim 16, wherein the pressure regulating valve comprises an inlet substantially disposed in the bottom chamber and an outlet substantially disposed in the top chamber.

18. The resealable bottle system of claim 14, wherein the top chamber comprises a safety valve.

* * * * *